3,207,713
PROCESS OF POLYMERIZING AND FOAMING A LACTAM USING AN ORGANIC CARBONATE COCATALYST
Thomas J. Hyde, Woodbury, N.J., assignor to E. I. du Pont de Nemours and Company, Wilmington, Del., a corporation of Delaware
No Drawing. Filed Dec. 7, 1962, Ser. No. 242,895
14 Claims. (Cl. 260—2.5)

This invention relates to a process, and more particularly to an improved process for the polymerization of lactams to polyamides.

The polymerization of caprolactam to give 6-nylon, a polyamide, has been known for many years. The earliest processes for this polymerization were slow, requiring several hours, and involved the use of water or acidic reagents as polymerization catalysts. Subsequent work showed that anhydrous caprolactam could be polymerized above 200° C. in the presence of strongly basic materials, particularly the alkali and alkaline earth metals, their hydrides, hydroxides, alkoxides, oxides, alkyls or amides. More recently, it has been disclosed that the base-catalyzed polymerization of caprolactam and other lactams can be made especially fast by the addition of certain compounds which function as cocatalysts. Particularly effective cocatalysts which have been disclosed include acylating agents such as acyl halides, anhydrides and the like; isocyanates, and compounds containing tertiary nitrogen having at least two of the three substituents on the nitrogen atom consisting of carbonyl, thiocarbonyl, sulfonyl, phosphenyl, thiophosphenyl and nitroso radicals.

The present invention provides an improved process for rapidly polymerizing lactams. More particularly, the process of this invention is an improvement in the process for polymerizing lactams in the presence of lactambase salts, which improvement comprises carrying out said polymerization in the presence of an organic carbonate having at least one carbocyclic aromatic group bonded through aromatic carbon to an oxygen of a carbonate group.

As just indicated, the cocatalysts employed in the process of this invention are organic carbonates, that is, organic compounds bearing at least one of the groups

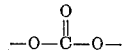

at least one of the unsatisfied bonds on the carbonate oxygens being satisfied by direct bonding to aromatic carbon of a carbocyclic aromatic group. The other oxygen can be bonded to an inorganic or another organic radical, which radical can be a terminal radical, or a bridging radical which links the aforementioned aromatic carbonate moiety to one or more similar, although not necessarily identical, aromatic carbonate moieties. Preferably, the cocatalysts contain at least one carbonate group for each 30 carbon atoms.

The aromatic group in the essential aromatic carbonate moiety of the cocatalysts employed in this invention can bear one or more of the aforementioned carbonate groups as the sole substituent thereon, or optionally it can bear aromatic, aliphatic or cycloaliphatic substituents, preferably of up to 18 carbon atoms, such as alkyl, cycloalkyl, aryl, alkoxy or aryloxy radicals, or inorganic substituents such as halogen substituents, provided only that under the polymerization conditions such substituents do not inhibit polymerization. The aforementioned substituents can be terminal substituents or, alternately, they can form bridging radicals linking the aforementioned aromatic carbonate moiety to another similar, although not necessarily identical, aromatic carbonate moiety. Thus, for example, the aromatic carbonate moieties can be joined to other aromatic carbonate moieties through organic radicals of the aforementioned type such as arylene or alkylene radicals including aralkylene and alkylarylene radicals, or through inorganic radicals such as oxygen, sulfonyl or imido radicals. Also, as previously indicated, each of the basic aromatic carbonate groups can contain more than one carbonate group, for example, up to 3 carbonate groups. In addition, two of the aromatic groups of the aromatic carbonate moiety can be joined directly to each other without the aforementioned bridging radicals.

Although certain types of groups are preferred, with the generic aspects of this invention great latitude is permissible in the selection of the group bonded to the second oxygen in the carbonate groups indicated in the above formula. Such second carbonate oxygen can be bonded to aromatic, aliphatic or cycloaliphatic radicals, preferably of up to 18 carbon atoms, including other aromatic carbonate groups or other aromatic groups such as phenyl or naphthyl groups which do not contain any carbonate substituents, or to alkyl, aryl or cycloalkyl moieties. As in the case of the substituents on the aromatic carbonate moiety, the radicals bonded to the second carbonate oxygen can be terminal radicals or bridging radicals, for example, arylene or alkylene radicals, linking the carbonate group to another aromatic carbonate moiety and can bear substituents such as those previously mentioned provided only that radicals and the substituents thereon do not inhibit polymerization. The second carbonate moiety can also be associated with, or bonded to, a metallic cation, for example, an alkali metal or alkaline earth cation.

Suitable compounds for use as cocatalysts in the present invention include:

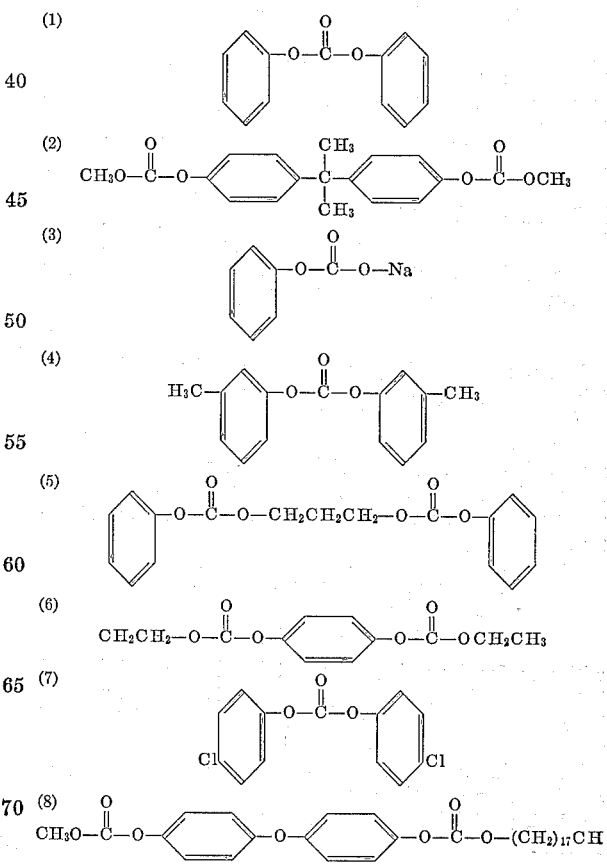

(9) 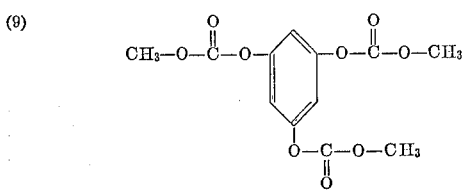

(10) 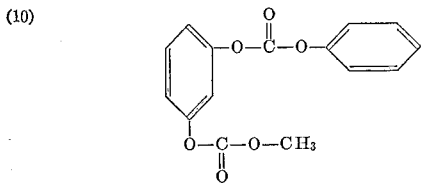

(11) 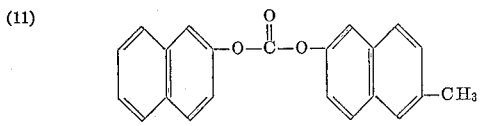

(12) 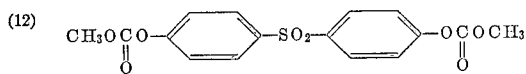

Particularly suitable as cocatalysts for use in the present invention are polymeric carbonates. These polymers are active as cocatalysts at any degree of polymerization (D.P.) up to 400 but the most suitable D.P. range is from about 10 to about 320. These compounds contain the structure

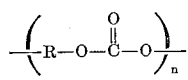

where $n$ is the number of repeating units. The R group contains a carbocyclic aromatic group filling the same requirements as of the carbocyclic aromatic group found in the monomeric carbonates suitable for practice of this invention. As an example of the advantage of using the aforementioned polymeric carbonates in the process of this invention, it is found that polycaprolactam prepared using the polymer as the cocatalyst is more dimensionally stable on aging than polycaprolactam prepared using the monomeric carbonate.

In addition, in commercial application of the instant invention two streams of ingredients are generally combined to prepare polymer articles. One of these streams usually contains caprolactam and the base catalyst. The second stream generally contains caprolactam, cocatalyst and other ingredients such as fillers. When the polymeric carbonates are used as cocatalysts they thicken the stream containing them thus reducing the tendency for the fillers to settle out of the composition.

The stream containing caprolactam and cocatalyst also, for convenience in commercial operation, should be able to withstand long periods of time while molten without losing the ability to polymerize quickly after the catalyst stream is added. Polymeric carbonates are particularly outstanding in this respect. For example, when a polycarbonate based on diphenylolpropane having the structure

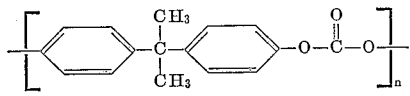

with a molecular weight of about 20,000 ($n=80$) is used in the cocatalyst stream at a level of 1.0 weight percent based on caprolactam, the cocatalyst-lactam mixture will withstand storage for 16 hours at 175° C. and still polymerize within about one minute when mixed with an equal quantity of a caprolactam-sodium caprolactam stream at 125° C. containing 2.0 weight percent of sodium caprolactam.

Suitable polymeric carbonate cocatalysts contain, among others, the following mer units:

(1) 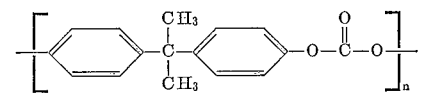

where $n=10$ to 400.

(2) 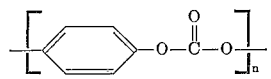

where $n=10$ to 400.

(3) 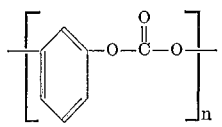

where $n=10$ to 400.

(4) 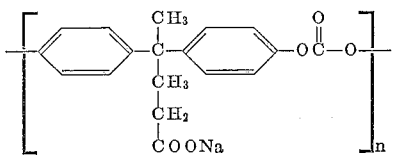

where $n=10$ to 400.

(5) 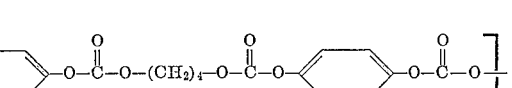

where $n=10$ to 400.

(6) 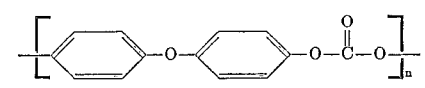

where $n=10$ to 400.

(7) 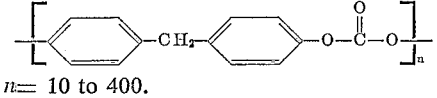

where $n=10$ to 400.

(8) 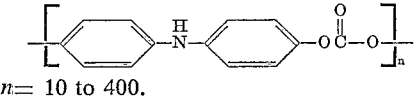

where $n=10$ to 400.

(9) 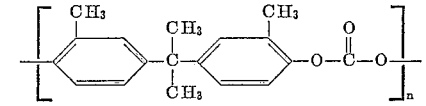

where $n=10$ to 400.

(10) 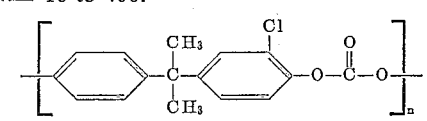

where $n=10$ to 400.

(11) 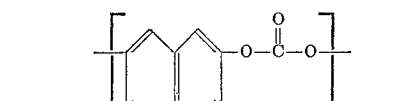

where $n=10$ to 400.

(12) 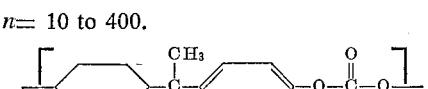

where $n=10$ to 400.

The preparation of polymeric carbonates is described in Kirk-Othmer, Encyclopedia of Chemical Technology, 2nd Supplement, Interscience, 1960, pp. 587–596.

Polymerization of lactams using the cocatalysts of the present invention surprisingly gives a polymer which does not stick to the mold and thus can be easily removed on cooling. Conventional means for ensuring release of the polymer from the mold involve the addition of mold release agents such as potassium stearate or silicone fluids either to the monomer mixture before polymerization or to the surface of the mold. Such conventional means have the disadvantage that they are expensive, in case of the silicone fluids, and/or they harm the physical properties of the polymer if incorporated into the monomer.

When the carbonates containing one carbocyclic aromatic and one aliphatic group attached to the carbonate radical are used as cocatalysts they give polycaprolactam having a lighter color than when carbonates containing two carbocyclic aromatic groups are used as cocatalysts. In addition, solutions of the former polymer in 90% formic acid contain a significantly lower quantity of gel particles than solutions of the latter polymer. This indicates that the degree of crosslinking in the polymer is less when the aromatic-aliphatic carbonates are used as cocatalysts.

The polymerization process of this invention is particularly effective in producing rapidly high molecular weight polyamides from lactams containing from 3 to 12 or more carbon atoms in the lactam ring. Such lactams include pyrrolidone, piperidone, ε and γ-caprolactam, enantholactam, caprylolactam, and laurolactam. Generally, the anionic polymerization process can be carried out a temperatures above the melting point of the lactam monomer but below the melting point of the resulting polyamide. In general, this temperature range is from about 25° C. to about 200° C., depending on the particular lactam employed. With lactams containing less than 6 carbon atoms in the lactam ring, the preferred temperature of polymerization is below 150° C. ε-caprolactam is readily polymerized by the process of this invention at temperatures between 100 and 200° C. with 150° C. being a convenient operating temperature.

The lactam-base salts used in the process of this invention are prepared by the reaction of bases with a lactam. Generally, the lactam to be polymerized is used for the preparation of the anionic catalyst; but if desired, the anionic catalyst can be prepared from another lactam.

The base employed to form the anionic catalyst can be an alkali metal, an alkaline earth metal, or a basic derivative of one of these metals such as hydroxide; alkoxide, hydride, alkyl, aryl, amide, or organic acid salt. All of these bases are of the type which are strong enough to convert the lactam to its iminium salt. Thus, sodium hydroxide, potassium hydroxide, lithium hydroxide, magnesium hydroxide, calcium hydroxide, strontium hydroxide, lithium hydride, sodium hydride, sodium methoxide, sodium methyl, sodium ethyl, sodium phenyl, sodium naphthyl, sodamide, sodium stearate and the like are suiable bases for the preparation of the anionic catalyst. The preferred base for use in the present invention, however, is sodium hydride because of the ease of removal of the hydrogen which is the other product formed when sodium hydride reacts with the lactam to form the sodium-lactam salt. The sodium hydride, for convenience in handling, can be used as a dispersion in oil.

The anionic catalyst, that is, the lactam-base salt, is prepared by heating the lactam with a base at a temperature between about 25 and 225° C. The base can be added to the total lactam which is to be polymerized or to a portion of the lactam which is to be polymerized and this portion of the resultant lactam containing the anionic catalyst added to more of the lactam later. The time required for this step in the process depends upon the strength of the base employed, the proportion added, and the temperature chosen and can be from a few seconds to several hours. Preferably, the lactam should be essentially anhydrous as should the added base. Generally, the amount of the base charged should be in the range of between 0.1 and about 10 mole percent on the total lactam used in preparing the anionic catalyst and the subsequent polymerization. Proportions in the higher end of this range produce lower molecular weight polyamides, so optimum proportions for most purposes are from about 0.5 to 4.0 mole percent of the strong base. The cocatalyst can be employed in proportions varying from about 0.01 to about 5.0 weight percent based on the total lactam used. The preferred range of cocatalyst concentration is from about 0.10 to about 3.0 weight percent of the lactam used. The cocatalyst can be added to the lactam containing the anionic catalyst, or equally well the cocatalyst can be dissolved in a separate portion of the lactam and the two portions of lactam mixed at the time the polymerization is desired. For optimum operation of the process of this invention an inert gas such as nitrogen is bubbled through the molten lactam during the initial reaction with the basic catalyst in order to remove any low molecular weight compound formed such as water and in order to prevent oxidation. Alternatively, the reaction of the lactam with the basic catalyst can be carried out under reduced pressure in which case the low molecular weight compound is distilled from the lactam.

The process of this invention is useful in rapidly preparing cast articles of any size and shape from lactams. The process can be employed to obtain unusual shapes which would be difficult, if not impossible, to obtain by conventional molding of prepolymerized polycarboxamides. The process has the advantage when used in this fashion that high temperatures and high pressures normally required in injection molding and similar processes are not necessary. Therefore, simpler lighter weight molds can be employed and faster cycles can often be obtained in the preparation of large, shaped articles. The entire process can be carried out in the mold or, if desired, the lactam solution containing the anionic catalyst and a second portion of the lactam solution containing the cocatalyst can be mixed and then immediately cast into the mold by procedures similar to transfer molding to obtain the desired shaped article in any size at a very high rate. Similarly, it is possible to employ the process of this invention in many extrusion-type operations, in which the lactam containing the anionic catalyst and another portion of the lactam containing the cocatalyst are intimately mixed and then extruded under conditions which provide for obtaining an extrudate which is polymerized as it is formed.

The process of this invention is operable in the presence of various fillers and reinforcing agents. Thus, if desired, glass mats or mats of synthetic fibers can be impregnated with the solution and rapidly cured. Similarly, finely divided fillers can be suspended in the polymerizing mixture to obtain filled polycarboxyamides. Antioxidants, blowing agents, plasticizers, other resins, e.g., styrene, acrylic, nylon, polyester, colorants, and the like may also be employed. The process of this invention contemplates the use of the process under all of the above conditions.

The process of this invention can likewise be used in the presence of a gas-generating material to give foamed plastic articles. The gas-generating material can be a low boiling liquid or an unstable compound which releases gas when heated. The process of this invention likewise can be carried out as a coating process in which the lactam solution containing anionic catalyst and the cocatalyst is applied as a liquid to the surface of a web such as paper or a textile and then permitted to polymerize to the polycarboxamides and thus form a coating of polycarboxamide film on a substrate.

The invention is more thoroughly illustrated with the aid of the following examples. Parts and percentages, where given, are by weight.

*Examples 1 through 16*

In these examples the determination of the effectiveness of the cocatalyst in promoting the rate of the polymerization of caprolactam is tested as follows.

Two portions of ε-caprolactam are prepared, one containing the catalyst and one the cocatalyst, each containing 11.3 parts of ε-caprolactam and the quantities of catalyst or cocatalyst, respectively, listed in the following table. Each of these portions is melted, brought to 150° C., the catalyst or cocatalyst added and the molten solutions sparged for 10 minutes with nitrogen. The two solutions are mixed, sparged for 30 seconds with nitrogen and held at 150° C. until polymerization occurs as measured by "no-flow time." This "no-flow time" is the time from the mixing of the two solutions until no perceptible flow of the melt is observed when the reaction vessel is held at a 40° angle.

The quantity of water-extractible material, which is chiefly lactam monomer, is determined by placing a weighed sample of finely divided polymer into a Soxhlet extractor, extracting it with boiling water overnight, drying the sample at 100 C. overnight and measuring the percentage weight loss. In all cases the polymer samples were cured for a total of 8 minutes at 150° C. prior to determining water extractibles.

The molecular weight of the polymers used as cocatalysts in the present invention is characterized by the inherent viscosity ($\eta_{inh}$) which is defined as follows:

$$\eta_{inh} = 2.303 \log \frac{\eta_r}{C}$$

where $$\eta_r = \frac{\eta \text{ solution}}{\eta \text{ solvent}}$$

and C is a concentration of 0.5 gram of polymer per 100 ml. of solvent. Unless otherwise indicated the solvent used was a mixture of tetrachloroethane and phenol (40/60) by weight.

The tensile strength of polymer specimens was determined using ASTM Method D–638 at 50% relative humidity.

with nitrogen while being heated to 150° C. during 5 minutes.

To another 40 part portion of ε-caprolactam is added 0.54 part of poly[2,2-propanebis(4-phenyl carbonate)] ($\eta_{inh}$=0.65) at 100° C. The melt is agitated with nitrogen while heating to 150° C. The two portions of ε=caprolactam are combined, sparged 15 seconds with nitrogen. Dodecnyl azide (0.64 part) is added and the mix sparged with nitrogen for 22 seconds additional.

The mix starts foaming 45 seconds after two streams are combined and is complete in 1 minute and 15 seconds after the stream combination. The tough foam has a density of 0.58 gram per milliliter.

Dodecenylazide, more precisely named 1-azido-5,5,7,7-tetramethyloctene-2, has the structure

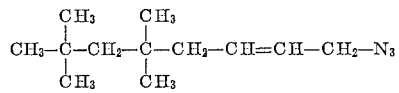

and is prepared by the reaction of the corresponding chloride with a slight excess of sodium azide as described in a copending application Serial No. 171,356, filed February 6, 1962.

*Example 18*

As an example of the improved dimensional stability of the polycaprolactam prepared using the polymeric cocatalysts over the polycaprolactam prepared using the monomeric cocatalyst, samples of polymer from Examples 7 and 11 which had been made at total polymerization times of 4 minutes and 8 minutes for both samples are cut into strips 8.5 inches long, 0.5 inch wide, and 0.1 inch thick. These strips are subjected to accelerated aging at 100° C.

| Example Number | Co-catalyst | Weight (parts) | Weight of NaH/oil (50:50 by weight) parts | No flow time (min.) | Water extractible material (percent) | Tensile strength (p.s.i.) |
|---|---|---|---|---|---|---|
| 1 | Di-p-tolyl carbonate | 0.121 | 0.100 | 1.0 | (*) | (*) |
| 2 | ----do---- | 0.060 | 0.050 | 2.5 | (*) | (*) |
| 3 | Di-o-tolyl carbonate | 0.121 | 0.100 | 1.0 | (*) | (*) |
| 4 | ----do---- | 0.060 | 0.100 | 1.25 | (*) | (*) |
| 5 | Bis-o-methoxyphenyl carbonate | 0.137 | 0.100 | 1.0 | 6.5 | 7,740 |
| 6 | ----do---- | 0.008 | 0.100 | 1.25 | (*) | (*) |
| 7 | Diphenyl carbonate | 0.107 | 0.100 | 1.25 | 5.5 | 7,840 |
| 8 | ----do---- | 0.054 | 0.100 | 1.50 | 6.9 | 8,000 |
| 9 | Diethyleneglycol bis(p-tolyl carbonate) | 0.119 | 0.100 | 0.75 | 4.1 | 8,520 |
| 10 | Diethyleneglycol bis(phenyl carbonate) | 0.086 | 0.100 | 1.00 | (*) | 7,755 |
| 11 | poly[2,2-propanebis(4-phenyl carbonate)] $\eta_{inh}$=0.65 | 0.125 | 0.100 | 1.25 | 5.6 | 7,590 |
| 12 | poly[2,2-propanebis(4-phenyl carbonate)] $\eta_{inh}$=1.06 | 0.125 | 0.100 | 1.50 | 3.4 | 7,320 |
| 13 | poly[2,2-propanebis(4[3,5-dichlorophenyl]carbonate)] $\eta_{inh}$=0.06 | 0.100 | 0.200 | 1.75 | 10.1 | (*) |
| 14 | Poly[phenolphthalein(4',4" carbonate)] $\eta_{inh}$=0.88 | 0.100 | 0.200 | 1.0 | 8.2 | (*) |
| 15 | Poly[2,2-hexafluoropropane-bis(4-phenyl carbonate)] $\eta_{inh}$=0.30 | 0.100 | 0.200 | 0.75 | 6.7 | (*) |
| 16 | Poly[oxybis(4-phenyl carbonate)] $\eta_{inh}$=0.66 | 0.100 | 0.200 | 0.75 | 7.4 | (*) |

*Not determined.

In order to show the superiority of the polymeric carbonates of the present invention over completely aliphatic carbonates as cocatalysts polyvinylene carbonate ($\eta_{inh}$=0.80 in dimethylformamide solution) is substituted for the poly[2,2-propanebis-(4-phenyl carbonate)] in the procedure of Example 11. The no flow time is 27 minutes and the polymer plug obtained is dark brown and brittle.

The procedure of Example 8 is repeated substituting molar equivalents of phenyl cyclohexyl carbonate and NaOMe for diphenyl carbonate and NaH. Equivalent results are obtained. The procedure of Example 8 is repeated substituting 4-cyclohexylphenyl methyl carbonate for diphenyl carbonate. Equivalent results are obtained.

*Example 17*

To caprolactam (40 parts) is added 0.51 part of NaH/oil (50:50 by weight) at 100° C. and the melt agitated for one week. The weight loss is then determined. The following results are obtained.

| Polymer from Example No. | Polymerization time (min.) | Weight loss (percent) |
|---|---|---|
| 7 | 4 | 0.61 |
| 11 | 4 | 0.35 |
| 7 | 8 | 0.35 |
| 11 | 8 | 0.21 |

From the table it can be seen that at short polymerization times necessary for economic molding operations the weight loss of the polycaprolactam made using diphenyl carbonate as the cocatalyst after aging for 1 week at 100° C. was 1.6 to 1.7 times that of the polycaprolactam made using poly[2,2-propanebis(4-phenyl carbonate)] as the cocatalyst. In addition, the shrinkage across the width of the former sample was about 30% greater than the shrinkage across the width of the latter sample. For the manufacture of parts which must maintain their dimensional stability over extended periods in use a polycaprolactam exhibiting low shrinkage and weight loss over a period of time is desirable.

I claim:

1. In the process for the polymerization of lactams having from 3 to 12 carbon atoms in the lactam ring to polyamides which comprises heating said lactam in the presence of a lactam-base salt made from about 0.1 to 10 mole percent base, the improvement which comprises adding to the lactam prior to polymerization an organic carbonate cocatalyst having at least one carbocyclic aromatic group bonded through aromatic carbon to an oxygen of a carbonate group.

2. A process for the polymerization of a lactam having from 3 to 12 carbon atoms in the lactam ring to a polyamide which comprises heating said lactam in the presence of a lactam base salt made from about 0.1 to 10 mole percent base and an organic carbonate cocatalyst having at least one carbocyclic aromatic group bonded through aromatic carbon to an oxygen of a carbonate group at a temperature between the melting point of said lactam and the melting point of said polyamide.

3. A process of claim 2 wherein said lactam is ε-caprolactam.

4. A process of claim 3 wherein said base is sodium hydride.

5. A process of claim 3 wherein said base is sodium methoxide.

6. A process of claim 3 wherein said organic carbonate catalyst is a polymer having the repeating structural unit

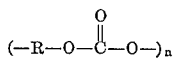

wherein $n$ is about from 10 to 320 and R is a carbocycilc aromatic group bonded through aromatic carbon to said carbonate group.

7. A process of claim 6 wherein said polymer is poly[2,2-propanebis(4-phenyl carbonate)].

8. A process of claim 3 wherein said cocatalyst bears two carbocyclic aromatic groups each bonded through aromatic carbon to one oxygen of one carbonate group.

9. A process of claim 8 wherein said cocatalyst is diphenyl carbonate.

10. A process of claim 3 wherein said cocatalyst is diethylene glycol bis(phenyl carbonate).

11. A process of claim 1 wherein said reaction is carried out in the presence of a gas evolving compound to yield a foamed plastic.

12. A process for the polymerization of ε-caprolactam to polycaprolactam which comprises heating said lactam in the presence of a lactam-base salt made from about 0.1 to 10 mole percent base and adding to the lactam prior to polymerization an organic carbonate cocatalyst having the repeating structural unit

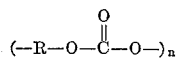

wherein $n$ is from about 10 to 320 and R is a carbocyclic aromatic group bonded through aromatic carbon to said carbonate group.

13. A process of claim 12 wherein the base is sodium hydride.

14. The process of claim 12 wherein the cocatalyst is poly[2,2-propanebis(4-phenyl carbonate)].

References Cited by the Examiner

UNITED STATES PATENTS

| | | | |
|---|---|---|---|
| 3,060,135 | 10/62 | Becke et al. | 260—2.5 |
| 3,065,189 | 11/62 | Becke et al. | 260—2.5 |

MURRAY TILLMAN, *Primary Examiner.*

JAMES A. SEIDLECK, *Examiner.*